(12) United States Patent
Abeysekera et al.

(10) Patent No.: US 12,127,060 B2
(45) Date of Patent: Oct. 22, 2024

(54) WIRELESS COMMUNICATION SYSTEM, AND WIRELESS COMMUNICATION METHOD

(71) Applicant: Nippon Telegraph and Telephone Corporation, Tokyo (JP)

(72) Inventors: Hirantha Abeysekera, Musashino (JP); Toshiro Nakahira, Musashino (JP); Takafumi Hayashi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 240 days.

(21) Appl. No.: 17/616,735

(22) PCT Filed: Jun. 21, 2019

(86) PCT No.: PCT/JP2019/024777
§ 371 (c)(1),
(2) Date: Dec. 6, 2021

(87) PCT Pub. No.: WO2020/255393
PCT Pub. Date: Dec. 24, 2020

(65) Prior Publication Data
US 2022/0330116 A1    Oct. 13, 2022

(51) Int. Cl.
*H04W 36/00* (2009.01)
*H04W 16/10* (2009.01)
(Continued)

(52) U.S. Cl.
CPC .......... *H04W 36/06* (2013.01); *H04W 16/10* (2013.01); *H04W 16/14* (2013.01); *H04W 36/0072* (2013.01); *H04W 72/0453* (2013.01)

(58) Field of Classification Search
CPC .... H04B 17/336; H04W 16/14; H04W 24/10; H04W 74/008; H04W 74/0816; H04J 3/1694
See application file for complete search history.

(56) References Cited

U.S. PATENT DOCUMENTS

2005/0032537 A1* 2/2005 Miyashita ............. H04W 36/06
                                                          455/423
2012/0238267 A1* 9/2012 Kim ...................... H04W 16/14
                                                          455/434

FOREIGN PATENT DOCUMENTS

JP    2005057550    3/2005
JP    2013017153    1/2013

OTHER PUBLICATIONS

Morikura et al., "802.11 High Speed Wireless LAN Textbook Revised 3rd Edition," Impress R & D, Mar. 27, 2008, pp. 6-9, 5 pages (with English translation).

* cited by examiner

*Primary Examiner* — Shukri Taha
(74) *Attorney, Agent, or Firm* — Fish & Richardson P.C.

(57) ABSTRACT

In a wireless communication system wherein wireless stations transmit on a shared frequency band, each of the wireless station includes means for notifying a control device of environmental information that includes information on interference from outside, and for switching from an operational channel to an evacuation channel notified by the control device when interference from outside is detected on the operational channel, and the control device includes means for calculating an evacuation channel for each wireless station according to a predetermined control procedure based on the environmental information collected from the wireless station, and for notifying the wireless station of the evacuation channel.

8 Claims, 5 Drawing Sheets

(51) Int. Cl.
*H04W 16/14* (2009.01)
*H04W 36/06* (2009.01)
*H04W 72/0453* (2023.01)

Fig. 6

| | W52 INDOOR, WITHOUT DFS | | | W53 INDOOR, WITH DFS | | | | | W56 OUTDOOR, WITH DFS | | | | | | | | | | |
|---|---|---|---|---|---|---|---|---|---|---|---|---|---|---|---|---|---|---|---|
| | 36 | 40 | 44 | 48 | 52 | 56 | 60 | 64 | 100 | 104 | 108 | 112 | 116 | 120 | 124 | 128 | 132 | 136 | 140 |
| <1-1> CURRENT OPERATIONAL CHANNEL | × | | | | | | | | | | | | | | | | | | |
| <1-2> INFORMATION ON RADAR DETECTED IN PAST 30 MINUTES | | | | | | | | | | | | | × | | | | | | |
| <1-3> OTHER CONDITIONS | | × | × | × | × | × | × | × | | | | | | | | | | | |
| GROUP OF CANDIDATE EVACUATION CHANNELS | | | | | | | | | | ○ | ○ | ○ | | ○ | ○ | ○ | ○ | ○ | ○ |
| <2-1> THE AVERAGE NUMBER OF TIMES N THAT RADAR SIGNALS ARE DETECTED | | | | | | | | | | 0.0 | 24.0 | 5.0 | | 2.0 | 4.0 | 5.0 | 4.0 | 5.0 | 1.0 |
| <2-2> THE NUMBER M OF NEARBY APs | | | | | | | | | | 10 | 4 | 5 | | 1 | 5 | 0 | 3 | 4 | 10 |
| EVALUATION VALUE BY EVALUATION FUNCTION (W=2) | | | | | | | | | | 9.1 E-2 | 7.1 E-16 | 1.6 E-4 | | 3.1 E-2 | 6.5 E-4 | 9.8 E-4 | 9.8 E-4 | 2.0 E-4 | 2.3 E-2 |
| EVALUATION VALUE BY EVALUATION FUNCTION (W=1) | | | | | | | | | | 9.1 E-2 | 1.2 E-8 | 5.2 E-3 | | 1.3 E-1 | 1.0 E-2 | 3.1 E-2 | 1.6 E-2 | 6.3 E-3 | 4.5 E-2 |
| EVALUATION VALUE BY EVALUATION FUNCTION (W=0) | | | | | | | | | | 0.1 | 0.2 | 0.2 | | 0.5 | 0.2 | 1.0 | 0.3 | 0.2 | 0.1 |

$$\text{EVALUATION FUNCTION} = \frac{1}{M+1} \times \frac{1}{2^{wN}}$$

☐ FIRST EVACUATION CHANNEL

⬚ SECOND EVACUATION CHANNEL

WIRELESS COMMUNICATION SYSTEM, AND WIRELESS COMMUNICATION METHOD

CROSS-REFERENCE TO RELATED APPLICATIONS

This application is a National Stage application under 35 U.S.C. § 371 of International Application No. PCT/JP2019/024777, having an International Filing Date of Jun. 21, 2019. The disclosure of the prior application is considered part of the disclosure of this application, and is incorporated in its entirety into this application.

TECHNICAL FIELD

The present invention relates to a wireless communication system and a wireless communication method for operating channels in a manner that avoids use of channels operated by other systems such as radar systems in a wireless communication system in which a plurality of wireless stations transmit on a shared frequency band.

BACKGROUND ART

In recent years, with the popularization of high-performance portable wireless terminals such as laptop computers and smartphones, wireless LANs compliant to the IEEE 802.11 standards have become widely used not only in business or public spaces but also at home. The IEEE 802.11 standards specifies a wireless LAN conforming to the IEEE 802.11b/g/n standard that uses the 2.4 GHz band and a wireless LAN conforming to the IEEE 802.11a/n/ac standard that uses the 5 GHz band.

For a wireless LAN conforming to the IEEE 802.11b standard or the IEEE 802.11g standard, 13 channels are provided at intervals of 5 MHz between 2400 MHz and 2483.5 MHz. When a plurality of channels are used at one place, a maximum of three channels or, in some cases, four channels can be used simultaneously so that the spectra of the channels do not overlap to prevent interference.

In Japan, for a wireless LAN conforming to the IEEE 802.11a standard, a total of 19 channels are specified, including non-overlapping 8 channels between 5170 MHz and 5330 MHz and non-overlapping 11 channels between 5490 MHz and 5710 MHz. In the IEEE 802.11a standard, the bandwidth of each channel is fixed to 20 MHz.

The maximum transmission rate of a wireless LAN conforming to the IEEE 802.11b standard is 11 Mbps and the maximum transmission rate of a wireless LAN conforming to the IEEE 802.11a standard or the IEEE 802.11g standard is 54 Mbps. It is noted that the aforementioned transmission rates refer to transmission rates in the physical layer. Because the transmission efficiency of the Medium Access Control (MAC) layer is about 50 to 70%, the actual maximum throughput is about 5 Mbps for the IEEE 802.11b standard and about 30 Mbps for the IEEE 802.11a standard and the IEEE 802.11g standard. With an increase in the number of wireless communication stations that attempt to transmit information, the transmission rates further decrease.

Meanwhile, for a wired LAN, high-speed lines of 100 Mbps to 1 Gbps, for example, via the Ethernet (R) 100Base-T interface, have become common with the prevalence of Fiber To The Home (FTTH) using optical fiber at home, and accordingly, a further improvement in the transmission rate of a wireless LAN is needed.

To this end, in the IEEE 802.11n standard finalized in 2009, the channel bandwidth, which had been fixed to 20 MHz, was expanded to 40 MHz and spatial multiplexing (Multiple Input Multiple Output) technology was introduced. By transmission and reception with all the functions specified in the IEEE 802.11n standard, a maximum communication rate of 600 Mbps can be achieved in the physical layer.

Moreover, in the IEEE 802.11ac standard finalized in 2013, the channel bandwidth was expanded to a maximum of 160 MHz (or 80+80 MHz) and a Multi-User MIMO (MU-MIMO) transmission method using Space Division Multiple-Access (SDMA) was introduced. By transmission and reception with all the functions specified in the IEEE 802.11ac standard, a maximum communication rate of about 6.9 Gbps can be achieved in the physical layer.

In the IEEE 802.11ax standard currently under development, an Orthogonal Frequency Division Multiple Access (OFDM) is expected to be specified, which enables frame transmission and reception by dividing the aforementioned 20 MHz, 40 MHz, 80 MHz, 160 MHz, or 80+80 MHz channels into smaller subchannels. The OFDMA allows a plurality of wireless stations to transmit simultaneously in resource units by dividing the above channels into smaller subchannels. In addition, in the IEEE 802.11ax standard, a new function is expected to be specified, which increases transmission opportunities while reducing interference from nearby cells by controlling a carrier sense threshold (CCA threshold).

Because a wireless LAN conforming to the IEEE 802.11 standards operates on unlicensed frequency bands in the 2.4 GHz band or the 5 GHz band, a wireless base station in the IEEE 802.11 standards selects and operates on one frequency channel from frequency channels usable by the wireless base station when the wireless base station establishes a wireless LAN cell (Basic Service Set (BSS)).

The wireless base station operates the cell by notifying wireless terminals under the control of the wireless base station and nearby wireless communication stations of a channel used in the cell, a bandwidth, set values for other parameters, and other parameters usable by the wireless base station by including them in regularly transmitted Beacon frames or a Probe Response frame to a Probe Request frame received from a wireless terminal and transmitting the frames on the frequency channel determined for the operation of the wireless base station.

At a wireless base station, a frequency channel, a bandwidth and other parameters can be selected and set by the following four methods:
 (1) Use default parameter values set by the manufacturer of the wireless base station
 (2) Use values manually set by a user operating the wireless base station
 (3) Select and set the parameter values autonomously based on wireless environmental information detected by each wireless base at its start-up
 (4) Set the parameter values to values determined by a centralized control station such as a wireless LAN controller The number of channels that can be used simultaneously at one place is three in a wireless LAN using the 2.4 GHz band and two, four, nine or nineteen in a wireless LAN using the 5 GHz band depending on the channel bandwidth used. Thus, a wireless base station needs to select channels to be used in its BSS when a wireless LAN is introduced (Non-Patent Literature 1).

In the 5 GHz band, the number of channels that can be used simultaneously at one place is nineteen when the channel bandwidth is 20 MHz and decreases to nine, to four and to two as the channel bandwidth expands from 20 MHz to 40 MHz, to 80 MHz and to 160 MHz or 80+80 MHz. That is, with an increase in the channel bandwidth, the number of usable channels decreases.

In a dense environment of a wireless LAN where the number of BSSs exceeds the number of usable channels, a plurality of BSSs use the same channel (Overlapping BSS (OBSS)). In such a wireless LAN, decentralized autonomous access control is provided, which allows data transmission on a channel when it is determined that the channel is unused by carrier sense using Carrier Sense Multiple Access with Collision Avoidance (CSMA/CA).

In particular, a wireless communication station where a transmission request occurs performs carrier sense first to monitor the state of the wireless medium for a predetermined sensing period (Distributed Inter-Frame Space (DIFS)) and performs random back-off if there is not any signal transmitted by other wireless communication stations in the sensing period. The wireless communication station continues to perform carrier sense in the random back-off period and is given a right to use the channel if there is not any signal transmitted by other wireless communication stations in the random back-off period. Whether transmission or reception is being performed or not by other wireless communication stations is determined depending on whether a signal larger than a preset carrier sense threshold is received or not. The wireless communication station having the right to use the channel can transmit data to other wireless communication stations in the same BSS and can receive data from those wireless communication stations. If such CSMA/CA control is used in a dense environment of a wireless LAN where the same channel can be used by a plurality of BSSs, it is frequently determined by carrier sense that the channel is busy and therefore the throughput degrades. Thus, it is important to monitor a surrounding environment, select a suitable channel, and select a transmission power value and a carrier sense threshold that enable simultaneous transmission and reception.

CITATION LIST

Non-Patent Literature

Non-Patent Literature 1: Morikura, Masahiro and Shuji Kubota, supervising editors. 802.11 High-Speed Wireless Lan Textbook. Rev. 3rd ed., Impress R&D, March 2008.

SUMMARY OF THE INVENTION

Technical Problem

Because the IEEE 802.11 standards do not specify a method for selecting the above-mentioned parameters, for example, for selecting the operating frequency band of a wireless base station from the 2.4 GHz band or the 5 GHz band and for selecting channels to be used in the operating frequency band, each vendor implements its own method.

Some part of the 5 GHz band open for wireless LANs are also used by other systems such as radar systems. Wireless LANs have to always detect signals from other systems because they are required to be operated so as not to interfere with other systems. For example, wireless LAN signal transmission has to be suspended for a certain period once a radar signal is detected on the current operational channel.

An object of the present invention is to provide a wireless communication system and a wireless communication method that can realize a high-quality wireless environment for every user by presetting channels to which the operational channel of each wireless station can be switched so that duration of suspending wireless LAN signal transmission can be shortened to improve the performance of the whole system.

Means for Solving the Problem

A first aspect of the present invention provides a wireless communication system wherein wireless stations transmit on a shared frequency band, each of the wireless stations including means for notifying a control device of environmental information that includes information on interference from outside, and for switching from an operational channel to an evacuation channel notified by the control device when interference from outside is detected on the operational channel, the control device including means for calculating the evacuation channel according to a predetermined control procedure based on the environmental information collected from the wireless station, and for notifying the wireless station of the evacuation channel.

A second aspect of the present invention provides a wireless communication method wherein wireless stations transmit on a shared frequency band, the method including: by each of the wireless stations, means for notifying a control device of environmental information that includes information on interference from outside, and for switching from an operational channel to an evacuation channel notified by the control device when interference from outside is detected on the operational channel, and by the control device, calculating the evacuation channel according to a predetermined control procedure based on the environmental information collected from the wireless station, and notifying the wireless station of the evacuation channel.

Effects of the Invention

The present invention can realize a high-quality wireless environment for every user by presetting evacuation channels to which the operational channel of each wireless station can be switched and switching to an evacuation channel when interference from outside is detected so that duration of suspending wireless LAN signal transmission can be shortened to improve the performance of the whole system.

BRIEF DESCRIPTION OF DRAWINGS

FIG. 6 is a diagram for describing a procedure of selecting evacuation channels.

DESCRIPTION OF EMBODIMENTS

Figure 1:
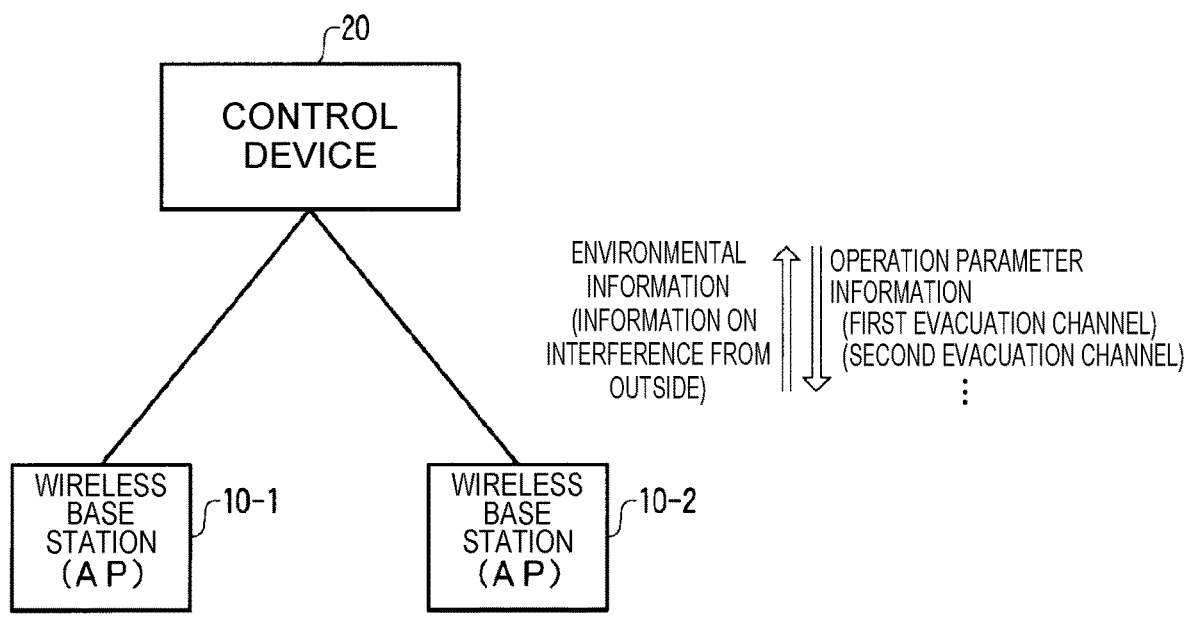
FIG. 1 is a diagram illustrating an exemplary configuration of a wireless communication system according to the present invention.

FIG. 1 illustrates an exemplary configuration of a wireless communication system according to the present invention. As an example of controlling wireless stations that operate on a shared frequency band, the present specification describes how the operational channels of wireless base stations (APs) are controlled.

In FIG. 1, the wireless communication system has a configuration in which a plurality of wireless base stations (APs) 10-1 and 10-2 are connected to a control device 20. Each of the APs 10-1 and 10-2 communicates with wireless terminals (not shown) under the control of the AP. Each of the APs 10-1 and 10-2 notifies the control device 20 of environmental information and operates on operation parameter information notified by the control device 20.

The environmental information includes information on interference from outside, for example, from a radar system on the operational channel of the AP. The operation parameter information includes channels to which the operational channel can be temporarily switched when interference from outside, for example, from a radar system is detected while the AP operates on the 5 GHz band. These channels to which the operational channel can be switched are hereinafter referred to as "evacuation channels."

Figure 2:
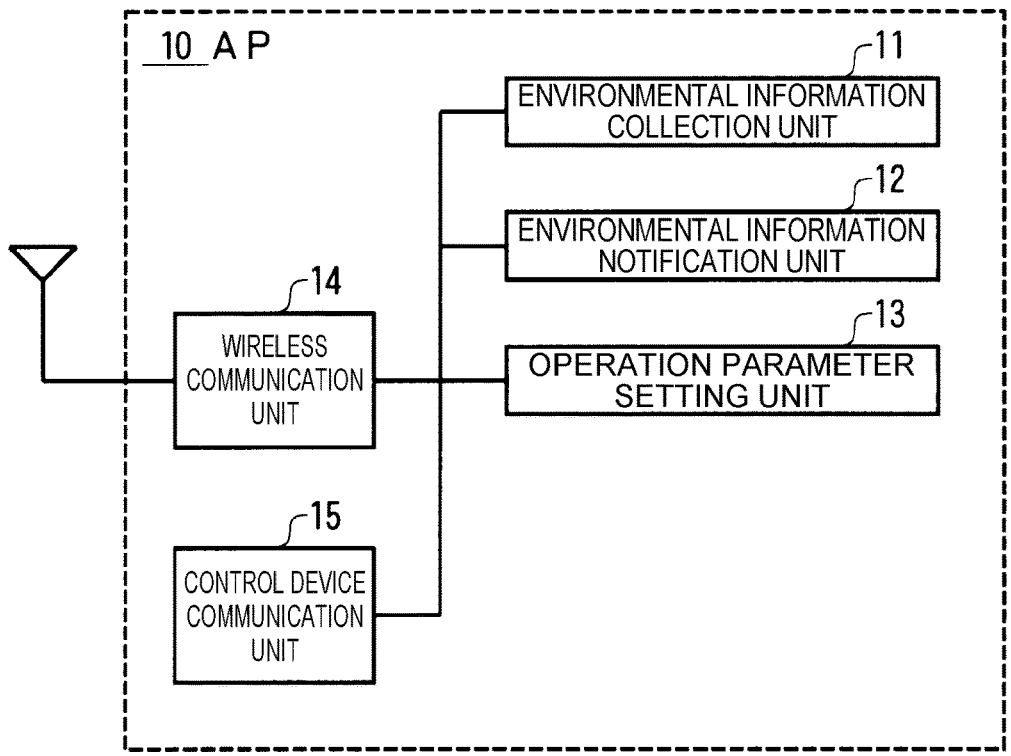
FIG. 2 is a diagram illustrating an exemplary configuration of a wireless base station (AP) 10.

FIG. 2 illustrates an exemplary configuration of a wireless base station (AP) 10. In FIG. 2, the AP 10 includes an environmental information collection unit 11 that collects, as environmental information, information on interference from outside, for example, from a radar system on the operational channel, an environmental information notification unit 12 that notifies the control device 20 of the environmental information, an operation parameter setting unit 13 that switches the operational channel to an evacuation channel according to operation parameter information (evacuation channels) notified by the control device 20 when interference from outside, for example, from a radar system is detected, a wireless communication unit 14 that communicates with wireless terminals under the control of the AP, and a control device communication unit 15 that communicates with the control device 20 in a wired or wireless manner.

Figure 3:
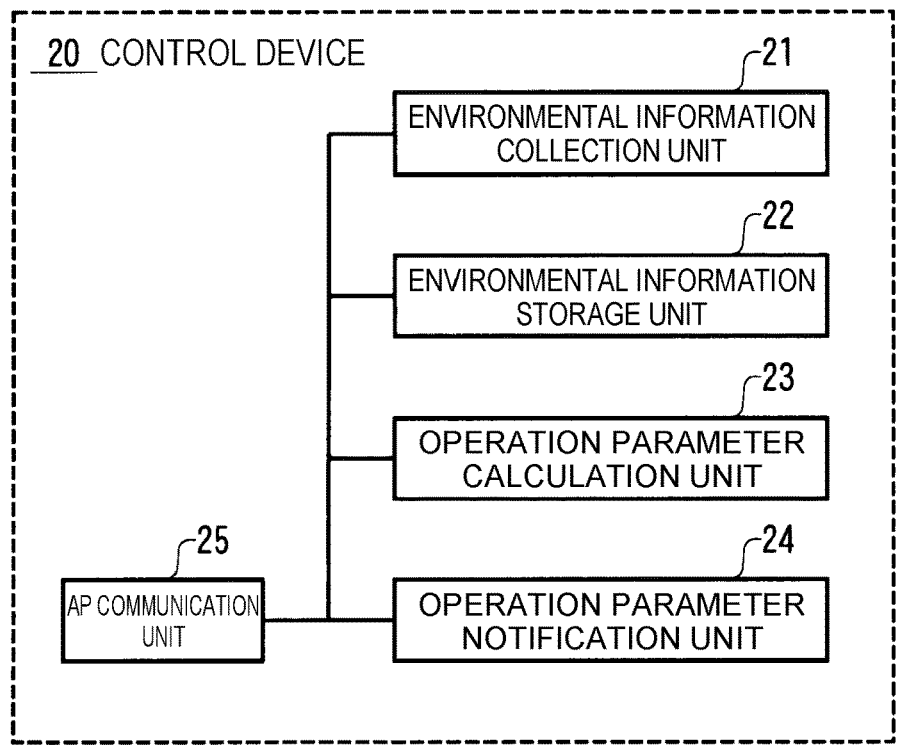
FIG. 3 is a diagram illustrating an exemplary configuration of a control device 20.

FIG. 3 illustrates an exemplary configuration of the control device 20. In FIG. 3, the control device 20 includes an environmental information collection unit 21 that collects environmental information (information on interference from outside) notified by each AP 10, an environmental information storage unit 22 that stores the collected environmental information, an operation parameter calculation unit 23 that determines operation parameters (evacuation channels) for each AP 10 based on the collected and stored environmental information, and an operation parameter notification unit 24 that provides a notification of the determined operation parameters (evacuation channels), and an AP communication unit 25 that communicates with each AP 10 in a wired or wireless manner.

Figure 4:
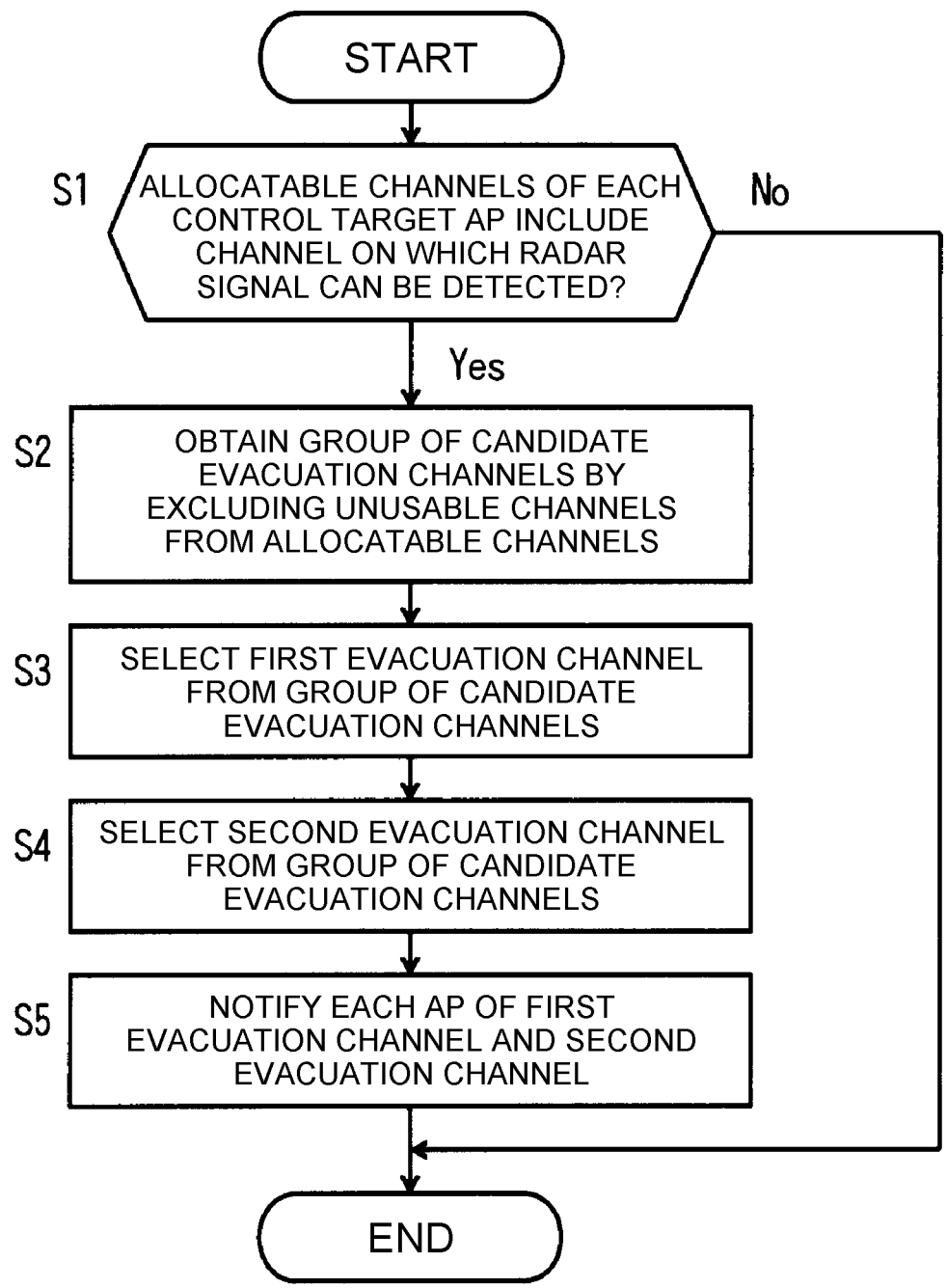
FIG. 4 is a diagram illustrating an operation flow of the control device 20 according to the present invention.

FIG. 4 illustrates an operation flow of the control device 20 according to the present invention. This operation flow shows a procedure of selecting evacuation channels for each AP, which is performed by the operation parameter calculation unit 23 of the control device 20.

In FIG. 4, the operation parameter calculation unit 23 first determines whether the allocatable channels of each control target AP include a channel on which a radar signal can be detected (S1). If the allocatable channels of the AP are of W52 (ch36 to ch48), for example, and a radar signal is not detectable on any of the allocatable channels, there is no need to select evacuation channels and notify the AP of the evacuation channels, and thus the operation parameter calculation unit 23 terminates the process.

Otherwise, if the allocatable channels of the AP are of W53 (ch52 to ch64) and W56 (ch100 to ch140) and include a channel on which a radar signal is detectable, the operation parameter calculation unit 23 proceeds to a process of selecting evacuation channels for the current operational channel. The operation parameter calculation unit 23 obtains a group of candidate evacuation channels by excluding unusable channels from the allocatable channels (S2). Examples of unusable channels are as follows:

<1-1> The current operational channel <1-2> A channel on which a radar signal was detected in the past T hours. T may vary in different countries, regions, and areas. For example, T=0.5 (=30 minutes). <1-3> A channel the use of which is prohibited in the region or area or by the wireless standard, or a channel the use of which is prohibited by operator settings or constraints of provided service Assuming that the allocatable channels are of W52 (ch36 to ch48), W53 (ch52 to W64) and W56 (ch100 to ch140), <1-1> the current operational channel is ch100, <1-2> a radar wave was detected in the past 30 minutes on ch116, and ch36 to ch64 are unusable according to the conditions in <1-3>, the unusable channels are indicated by x in FIG. 6 and a group of candidate evacuation channels obtained by excluding the unusable channels are indicated by ○ in FIG. 6. The group of candidate evacuation channels includes ch104, ch108, ch112, ch120, ch124, ch128, ch132, ch136 and ch140.

The operation parameter calculation unit 23 selects a first evacuation channel from the group of candidate evacuation channels (S3). The operation parameter calculation unit 23 calculates an evaluation function using environmental information for each of the group of candidate evacuation channels, and selects the channel having the largest evaluation value as the first evacuation channel. Examples of the environmental information used in the evaluation function and an example of the evaluation function are given below.

<2-1> The average number of times N that radar signals are detected per day, which is used as past radar detection information for each channel. <2-2> The number M of nearby APs that operate on each channel and the signal strengths of which are equal to or less than a predetermined threshold.

$$\text{Evaluation function} = (1/(M+1)) \times (1/2^{wN})$$

In the above evaluation function, w is a weighting coefficient. The influence, on the evaluation function, of the average number of times N that radar signals are detected is largest when w=0 and decreases as w becomes larger.

FIG. 6 shows the evaluation values calculated by the evaluation function using the average number of times N that radar signals are detected, the number M of nearby APs and the weight w=0, 1, 2. As the first evacuation channel, ch128 is selected when w=0, ch120 is selected when w=1, and ch104 is selected when w=2.

Because if a radar wave is detected on the current operational channel, the bandwidth of the radar wave may cover more than one channel, the operation parameter calculation unit 23 selects a second evacuation channel on the additional condition that one neighboring channel on each side of the current operational channel is excluded as an unusable channel (S4). Similarly, the operation parameter calculation unit 23 may select a third evacuation channel on the additional condition that two neighboring channels on each side of the current operational channel are excluded as unusable channels.

In the example shown in FIG. 6, the current operational channel is ch100, and thus ch104 next to the operational channel is excluded from the group of candidate evacuation channels. Then, the channel having the largest evaluation value by the evaluation function is selected as the second evacuation channel from the group of candidate evacuation channels. The second evacuation channel is ch128 when w=0 and ch120 when w=1 as with the first evacuation channel. When w=2, since the first evacuation channel, ch104, having the largest evaluation value is excluded, ch120, which has the second largest evaluation value, is selected instead.

The operation parameter notification unit 24 notifies each AP of the first evacuation channel and the second evacuation channel (S5). In the example in FIG. 6, when w=2, the operation parameter notification unit 24 provides a notification of the first evacuation channel being ch104 and the second evacuation channel being ch120. Similarly, the operation parameter notification unit 24 may select and provide a notification of a third evacuation channel, a fourth evacuation channel, and the like.

Figure 5:
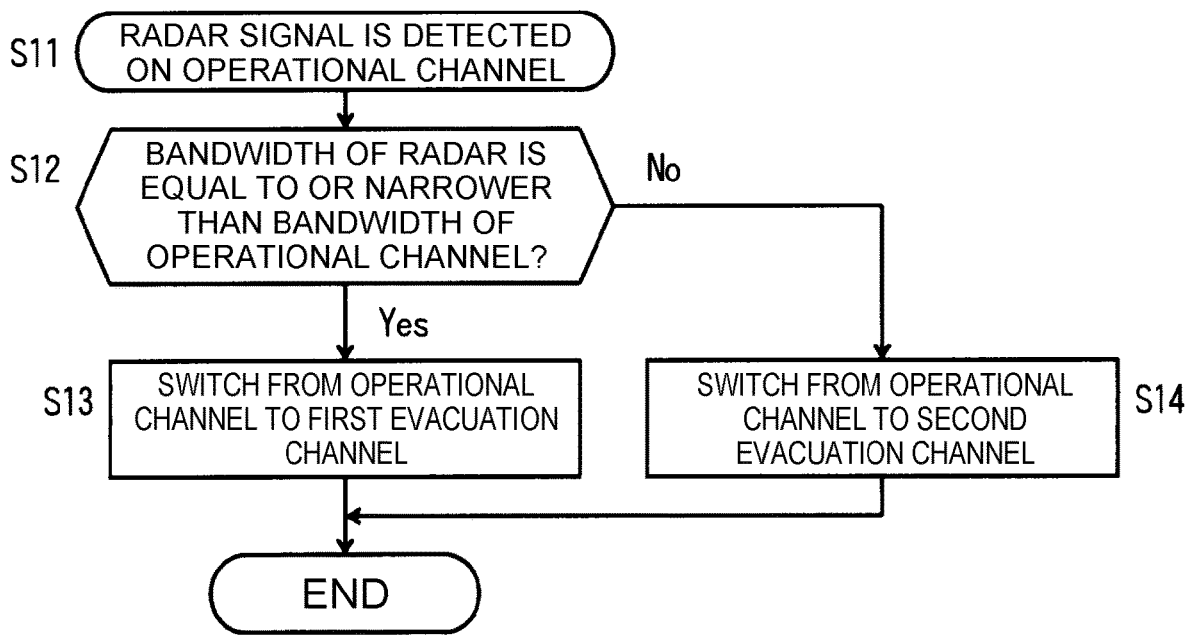
FIG. 5 is a diagram illustrating an operation flow of the wireless base station (AP) 10 according to the present invention.

FIG. 5 illustrates an operation flow of the AP 10 according to the present invention. This operation flow shows a procedure of switching to an evacuation channel when a radar signal is detected on the operational channel of the AP 10, which is performed by the operation parameter setting unit 13.

In FIG. 5, when a radar signal is detected on the operational channel (S11), the operation parameter setting unit 13 determines whether or not the bandwidth of the radar signal is equal to or narrower than the bandwidth of the operational channel (S12). The operation parameter setting unit 13 switches to a first evacuation channel notified by the control device 20 if the bandwidth of the radar signal is equal to or narrower than the bandwidth of the operational channel (S13), or switches to a second evacuation channel if the bandwidth of the radar signal is wider than the bandwidth of the operational channel and covers neighboring channels of the operational channel (S14). This makes it possible to switch quickly from the operational channel on which a radar signal is detected to an evacuation channel.

REFERENCE SIGNS LIST

10 Wireless base stations (APs)
11 Environmental information collection unit
12 Environmental information notification unit
13 Operation parameter setting unit
14 Wireless communication unit
15 Control device communication unit
20 Control device
21 Environmental information collection unit
22 Environmental information storage unit
23 Operation parameter calculation unit
24 Operation parameter notification unit
25 AP communication unit

The invention claimed is:

1. A wireless communication system comprising wireless stations configured to transmit on a shared frequency band and a control device, wherein each of the wireless stations are configured to notify the control device of environmental information that includes information on interference from outside, and to switch from an operational channel to an evacuation channel notified by the control device when interference from outside is detected on the operational channel; and the control device is configured to calculate the evacuation channel using a control procedure based on the environmental information collected from the wireless station, and notify the wireless station of the evacuation channel, the control procedure comprising:

obtaining a group of candidate evacuation channels;

for each candidate evacuation channel, computing a respective evaluation score using an evaluation function that depends on a number of times that the interference from the outside has been detected in the respective candidate evacuation channel in the past; and selecting, as a first evacuation channel from the group of candidate evacuation channels, a channel having a largest evaluation score computed using the evaluation function, wherein the evaluation function is defined as $(1/(M+1)) \times (1/2^{wN})$, wherein M is the number of neighboring wireless stations that operate on the operational channel and have signal strengths equal or below the predefined threshold, N is an average number of times per day of that the interference has been detected in the respective candidate evacuation channel in the past, and w is a weighting coefficient.

2. The wireless communication system according to claim 1, wherein the group of candidate evacuation channels are obtained by excluding unusable channels from allocatable channels of the wireless station.

3. The wireless communication system according to claim 1, wherein the control procedure further includes selecting, as a second evacuation channel, a channel having the largest evaluation score calculated using the evaluation function when neighboring channels of the operational channel are excluded from the group of candidate evacuation channels in case a bandwidth of the interference from outside is wider than a bandwidth of the operational channel.

4. The wireless communication system according to claim 3, wherein the wireless station is further configured to switch to the first evacuation channel when the bandwidth of the interference from outside is not wider than the bandwidth of the operational channel, and to the second evacuation channel when the bandwidth of the interference from outside covers the neighboring channels of the operational channel.

5. A wireless communication method for wireless stations to transmit on a shared frequency band, the method comprising:

by each of the wireless stations, notifying a control device of environmental information that includes information on interference from outside, and switching from an operational channel to an evacuation channel notified by the control device when interference from outside is detected on the operational channel; and by the control device, calculating the evacuation channel using a control procedure based on the environmental information collected from the wireless station, and notifying the wireless station of the evacuation channel, the control procedure comprising:

obtaining a group of candidate evacuation channels by excluding unusable channels from allocatable channels of the wireless station;

for each candidate evacuation channel, computing a respective evaluation score using an evaluation function that depends on a number of times that the interference from the outside has been detected in the respective candidate evacuation channel in the past; and selecting, as a first evacuation channel from the group of candidate evacuation channels, a channel having a largest evaluation score computed using the evaluation function, wherein the evaluation function is defined as $$(1/(M+1)) \times (1/2^{wN}),$$

wherein M is the number of neighboring wireless stations that operate on the operational channel and have signal strengths equal or below the predefined threshold, N is an average number of times per day of that the interference has been detected in the respective candidate evacuation channel in the past, and w is a weighting coefficient.

6. The wireless communication method according to claim 5, wherein the group of candidate evacuation channels are obtained by excluding unusable channels from allocatable channels of the wireless station.

7. The wireless communication method according to claim 5, wherein the control procedure further includes selecting, as a second evacuation channel, a channel having the largest evaluation score calculated using the evaluation function when neighboring channels of the operational channel are excluded from the group of candidate evacuation channels in case a bandwidth of the interference from outside is wider than a bandwidth of the operational channel.

8. The wireless communication method according to claim 7, further comprising:

by each of the wireless stations, switching to the first evacuation channel when the bandwidth of the interference from outside is not wider than the bandwidth of the operational channel, and to the second evacuation channel when the bandwidth of the interference from outside covers the neighboring channels of the operational channel.

\* \* \* \* \*